Sept. 2, 1924.

A. G. M. MICHELL

FILM LUBRICATED BEARING

Filed Sept. 12, 1922 2 Sheets-Sheet 1

1,507,020

Inventor
Anthony G. M. Michell,
By [signature]
Atty

Sept. 2, 1924.

A. G. M. MICHELL

FILM LUBRICATED BEARING

Filed Sept. 12, 1922    2 Sheets-Sheet 2

1,507,020

Inventor
Anthony G. M. Michell.
By
atty.

Patented Sept. 2, 1924.

1,507,020

UNITED STATES PATENT OFFICE.

ANTHONY GEORGE MALDON MICHELL, OF MELBOURNE, VICTORIA, AUSTRALIA, ASSIGNOR TO MICHELL BEARINGS LIMITED, OF WESTMINSTER, ENGLAND.

FILM-LUBRICATED BEARING.

Application filed September 12, 1922. Serial No. 587,722.

*To all whom it may concern:*

Be it known that ANTHONY GEORGE MALDON MICHELL, a subject of the King of Great Britain, residing at Melbourne, in the State of Victoria, Commonwealth of Australia, has invented certain new and useful Improvements in Film-Lubricated Bearings, of which the following is a specification.

This invention relates to improvements in bearings of the class in which the bearing surfaces consists of a plurality of similar bearing elements. The improvements are applicable to both journal and thrust bearings, such for example as are described in the present applicant's patent specification No. 3870 of 1917. In the use of bearings of this class on horizontal shafts, if the bearings are arranged in a bearing box containing a bath of fluid lubricant the level of which is below the shaft, the lubricant supplied to the lower elements is more or less diverted laterally and the supply delivered to the upper elements is restricted unless special means are provided to feed the latter.

According to the present invention this difficulty of an assured complete supply of lubricant to the upper bearing elements is overcome in a simple manner by a special construction of the shoes whereby each shoe is arranged to forward the lubricant to the succeeding shoe, and to receive lubricant from the preceding shoe. Briefly stated the essential characteristic of the invention consists of bearing shoes having "leading-in" edges constructed to extend beyond the "leading-out" edge of the preceding shoe for the purpose of diverting the lubricant to the "leading-in" edge of the next succeeding shoe which lubricant would otherwise pass the latter.

Drawings accompanying this specification depict bearing shoes having above characteristic and practically applied to thrust and journal bearing.

Figure 1:
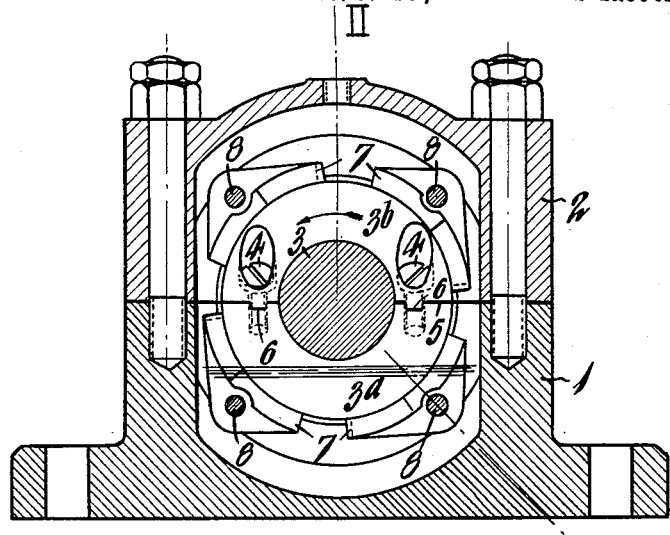
Figure 2:
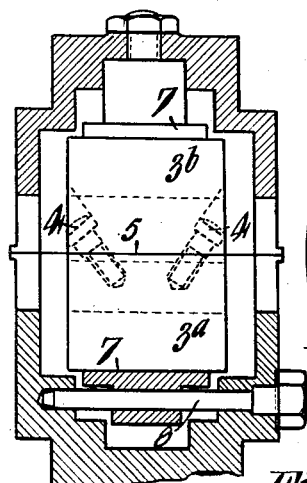
Figure 4:
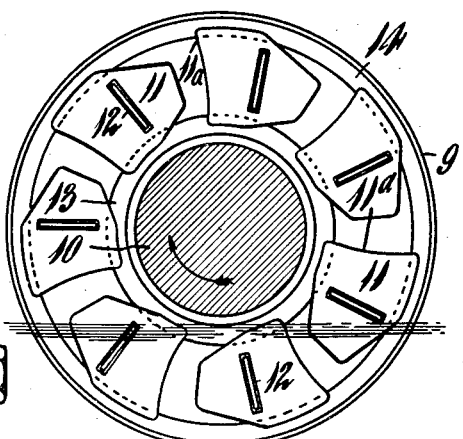
Figure 3:
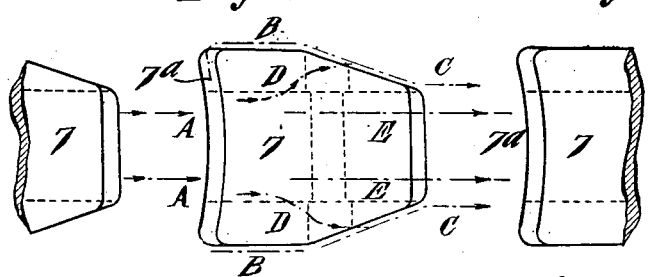
Figure 5:
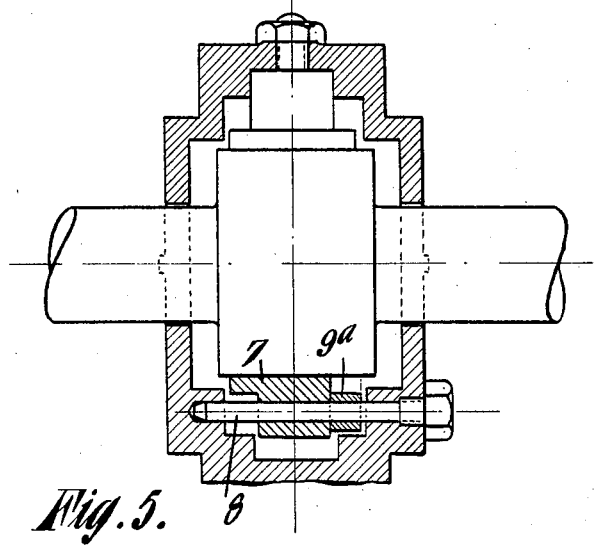
Figure 6:
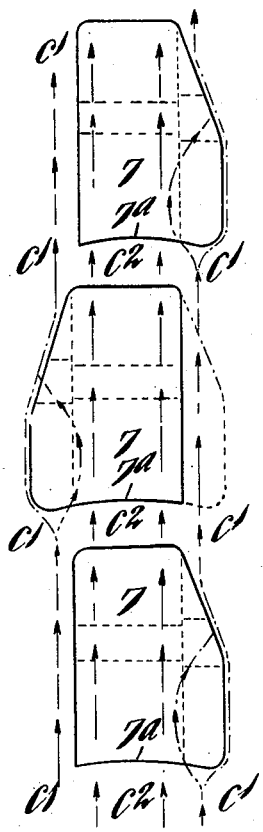

In these drawings Figures 1 to 3 relate to a journal bearing and Figure 4 illustrates the application of the invention to a thrust bearing. Figure 1 is a cross-section of a journal bearing and shaft showing the bearing elements in elevation; Figure 2 is a longitudinal section (partly in elevation) on the lines II—II of Fig. 1; Fig. 3 is an enlarged plan view of a set of three of the bearing shoes with working faces uppermost; Figure 4 is a cross-section of a thrust bearing. Fig. 5 is a section corresponding to Fig. 2 of an alternative construction of journal bearing; and Fig. 6 is a plan view of the same alternative construction corresponding to Fig. 3.

According to Figures 1 to 3 the bearing box 1 is covered by a cap 2.

In order to make the bearing adaptable to shafts of ordinary imperfect accuracy of finish the shaft 3, is provided with a sleeve in two parts $3^a$, $3^b$, held together by screws 4 so as to be secure upon the shaft and so as to present an accurately cylindrical external surface. In order that the continuity of this surface shall not be appreciably affected by the joint 5 between the halves $3^a$, $3^b$, of the sleeve, the latter are machined together by means of the tongues and grooves 6 before the external cylindrical surfaces of the sleeve are finished, the last operation being preferably effected by grinding.

The bearing sleeve $3^a$, $3^b$, is supported by and revolves within the bearing shoes 7, which form the separate elements of the stationary bearing surface. The shoes 7 may be constructed as yielding elements of a common casting as shown in Figures 7, 8 and 9 of the patent specification 3870 of 1917 above-mentioned or, as illustrated in the present drawings, they may be pivotally mounted upon the pins 8 which are secured in the bearing box 1 and cap 2 as shown.

The bearing box 1 having its lower portion filled with lubricant as indicated in Figure 1, the lower portion of the bearing sleeve $3^a$, $3^b$ will be submerged in oil and, as the shaft 3 and sleeve revolve in the direction of the arrow in Figure 1, lubricant will be carried up upon the surface of the sleeve to lubricate the shoe on the right-hand side of the bearing as seen in the figure. In order to insure a proper supply of lubricant to all of the shoes 7 in succession, each shoe is constructed as shown in Figure 3, the surface in contact with the sleeve $3^a$, $3^b$, being roughly triangular or scutiform having its broader end opposed to the direction of the motion of the sleeve. This broader end $7^a$, is made concave in outline as shown in Figure 3. With this construction the oil carried upon the surface of the sleeve, as indicated by the arrows A—A is partly deflected as indicated by the arrows shown on the lines B—B and is directed around the outer edges of the shoe 7, being held thereto by capillary tension and this portion is ultimately delivered from the shoe as shown by the arrows C—C. At the same time the remaining portion of the lubricant delivered to the concave edge of the shoe 7 passes between it and the surface of the sleeve $3^a$, $3^b$, serving to lubricate the said surface and is thus delivered partly at the sides of the shoe 7 as shown by the arrows D—D (this portion joining the streams C. C. already described) and partly through the narrower end of the block as shown by the arrows E—E. It will thus be seen that the whole of the lubricant which is delivered to the shoe to effect its lubrication is owing to the tapering or scutiform shape of the shoe again delivered to the next succeeding shoe, shown in Figure 3.

It will be understood that any other suitable form of support may be used for the shoes 7 in place of the pins 8. Further, that the sleeve $3^a$, $3^b$ may be formed in a single piece in cases where it may be conveniently passed along the shaft from one end, instead of being in two separate parts as shown or as an alternative to a sleeve, the shaft may itself be turned with a portion or larger diameter than the remainder, such portion serving the same purposes as the sleeve.

This construction is illustrated in Fig. 5. In the alternative construction of the invention illustrated in Figs. 5 and 6 a portion of each of the shoes 7 shown in Figs. 2 and 3 is dispensed with, namely the lateral portion indicated by dotted lines in the middle one of the three shoes shown in Fig. 6. In consequence of this modification of the construction, the leading-in edge of each shoe is wider towards one side only, than the leading-out edge of the preceding shoe, and the widening is on opposite sides in successive shoes. In other words the lateral extension of the leading-in edges of the series of shoes may be defined as being arranged in staggered circumferential relationship.

In order to retain the shoes 7 in their correct positions on the pins 8, the latter may be fitted with bushes $9^a$, as shown in Fig. 5 on the sides of the shoes 7, opposite to their wide leading-in edges.

In this modified construction, the oil which is delivered in the stream $C^1$, Fig. 6 from the leading-out edge of each shoe on the side of its wide leading-in edge is intercepted by the leading-in edge not of the following shoe but of the second in succession. The oil which is delivered in the stream $C^2$, from the leading-out edge of each shoe on the side opposite to its leading-in edge is, however, intercepted by the leading-in edge of the immediately following shoe, in the same way as illustrated in Fig. 3.

In the application of the invention to thrust bearings as shown in Figure 4, a flat surfaced thrust collar 9 is formed in the usual way upon the shaft 10, the said collar 9 dipping into a bath of lubricant as indicated in Figure 4. The thrust blocks 11, which make working contact with the collar 9 may be either flexibly supported as shown in the drawing of patent specification No. 3870/17 or may be separate blocks as shown in Figure 4, pivotally supported on the pivots 12, which rest upon a fixed bearing ring not shown. For convenience the blocks 11 may be threaded upon rings 13, 14 respectively, engaging with grooves formed in the inner and outer edges of the blocks. The blocks 11 are of a scutiform outline similar to that of the shoes 7 of the bearing described in connection with the Figures 1 to 3 and their front edges $11^a$ are similarly concave to those ($7^a$) of the shoe 7. The operation of the thrust bearing will be clearly understood from the description given in connection with the Figure 3.

I claim:—

1. In a bearing of the character described, the combination of a rotary shaft, a plurality of bearing shoes each having a leading-in edge opposed to the direction of rotation of the shaft and a leading-out edge of less width transversely than the leading-in edge.

2. In a bearing of the character described, the combination of a rotary shaft, a plurality of bearing shoes each having a leading-in edge opposed to the direction of rotation of the shaft and a substantially parallel leading-out edge of less width transversely than the leading-in edge.

3. In a bearing of the character described, the combination of a rotary shaft, a plurality of bearing shoes each having a leading-in edge opposed to the direction of rotation of the shaft and a leading-out edge of less width transversely than the leading-in edge, each shoe having a converging side terminating in the leading-out edge.

4. In a bearing of the character described, the combination of a rotary shaft, a plurality of bearing shoes each having a leading-in edge opposed to the direction of rotation of the shaft and a leading-out edge of less width transversely than the leading-in edge, each shoe having symmetrically converging sides terminating in the leading-out edge.

5. In a bearing of the character described, the combination of a rotary shaft, a plurality of bearing shoes, arranged circumferentially around the shaft each shoe having a broad leading-in edge opposed to the direction of rotation of the shaft, and a leading out edge of less width transversely than the leading-in edge, the sides of the shoes being parallel a portion of their length.

6. In a bearing of the character described, the combination of a rotary shaft, a plurality of bearing shoes arranged circumferentially around the shaft, each shoe having a broad leading-in edge opposed to the direction of rotation of the shaft, and a leading out edge of less width transversely than the leading in edge, said shoes having parallel sides and converging ends terminating in the leading-out edges.

7. In a bearing of the character described, the combination of a rotary shaft, a plurality of bearing shoes arranged circumferentially around the shaft, each shoe having a broad leading-in edge opposed to the direction of rotation of the shaft, and a leading-out edge of less width transversely than the leading in edge, the leading-in edge of one shoe being located behind the leading-out edge of the preceding shoe, the front portion of the sides of the shoes being parallel and the rear portion converging and terminating in the leading-out edges.

Dated this 4th day of August 1922.

ANTHONY GEORGE MALDON MICHELL.